US012594856B2

(12) United States Patent
Oh

(10) Patent No.: US 12,594,856 B2
(45) Date of Patent: Apr. 7, 2026

(54) VEHICLE AND METHOD FOR CONTROLLING POWER SUPPLY TO EXTERNAL LOAD BASED ON SOC

(71) Applicants: Hyundai Motor Company, Seoul (KR); Kia Corporation, Seoul (KR)

(72) Inventor: Hong Min Oh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 225 days.

(21) Appl. No.: 18/077,449

(22) Filed: Dec. 8, 2022

(65) Prior Publication Data

US 2023/0322123 A1    Oct. 12, 2023

(30) Foreign Application Priority Data

Jul. 4, 2022    (KR) ......................... 10-2022-0081683

(51) Int. Cl.
| | |
|---|---|
| *B60L 58/15* | (2019.01) |
| *B60L 3/00* | (2019.01) |
| *B60L 53/20* | (2019.01) |
| *B60L 53/66* | (2019.01) |
| *H01M 10/42* | (2006.01) |

(52) U.S. Cl.
CPC ............. *B60L 58/15* (2019.02); *B60L 3/0046* (2013.01); *B60L 53/20* (2019.02); *B60L 53/66* (2019.02); *H01M 10/425* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2010/0217485 A1* | 8/2010 | Ichishi | ................ | H01M 10/441 701/36 |
| 2013/0144519 A1* | 6/2013 | Nakano | .................. | B60L 50/16 701/123 |
| 2013/0253740 A1* | 9/2013 | Kim | ........................ | B60L 58/12 701/123 |

(Continued)

FOREIGN PATENT DOCUMENTS

KR    10-2016-0150375 A    12/2016

*Primary Examiner* — James J Lee
*Assistant Examiner* — Melanie G Huber
(74) *Attorney, Agent, or Firm* — MORGAN, LEWIS & BOCKIUS LLP

(57) ABSTRACT

A vehicle includes a battery, a converter connected to the battery and configured to provide electrical power of the battery to an external load, a navigation device configured to obtain current location information and charging place information, and a controller connected to the battery and the converter, and configured to control the battery and the converter. The controller is configured to determine a required energy of the vehicle to travel from a current location of the vehicle to a nearest charging place after end of driving and parking of the vehicle, determine a safety state of charge (SOC) value of the battery for ensuring driving of the vehicle to the nearest charging place based on the required energy and a total capacity of the battery, and control the converter to stop supplying power to the external load in response to an SOC of the battery reaches the safety SOC.

9 Claims, 5 Drawing Sheets

(56)             References Cited

U.S. PATENT DOCUMENTS

| | | | |
|---|---|---|---|
| 2014/0327408 A1* | 11/2014 | Ishii | B60L 50/51 |
| | | | 320/135 |
| 2017/0028852 A1* | 2/2017 | Skaff | B60K 35/22 |
| 2017/0096134 A1* | 4/2017 | Yoon | B60W 20/13 |
| 2019/0001957 A1* | 1/2019 | Park | B60W 10/08 |
| 2019/0263272 A1* | 8/2019 | Washizu | B60L 1/00 |
| 2022/0266704 A1* | 8/2022 | Kobayashi | B60L 53/16 |
| 2022/0332332 A1* | 10/2022 | Nakagawa | B60L 58/12 |
| 2023/0202329 A1* | 6/2023 | Bahei-Eldin | H02J 7/0048 |

* cited by examiner

FIG. 2

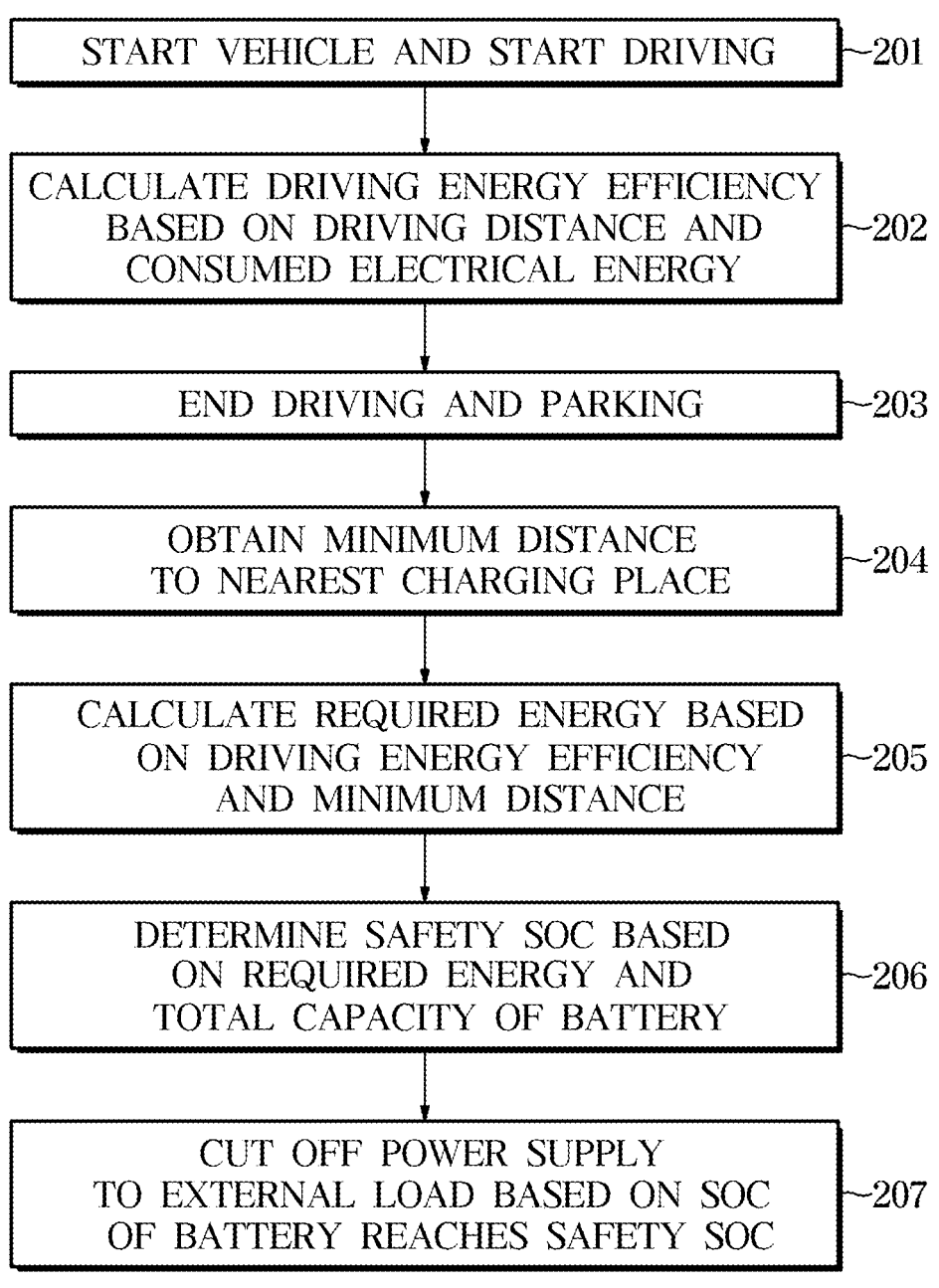

START VEHICLE AND START DRIVING ~201

CALCULATE DRIVING ENERGY EFFICIENCY BASED ON DRIVING DISTANCE AND CONSUMED ELECTRICAL ENERGY ~202

END DRIVING AND PARKING ~203

OBTAIN MINIMUM DISTANCE TO NEAREST CHARGING PLACE ~204

CALCULATE REQUIRED ENERGY BASED ON DRIVING ENERGY EFFICIENCY AND MINIMUM DISTANCE ~205

DETERMINE SAFETY SOC BASED ON REQUIRED ENERGY AND TOTAL CAPACITY OF BATTERY ~206

CUT OFF POWER SUPPLY TO EXTERNAL LOAD BASED ON SOC OF BATTERY REACHES SAFETY SOC ~207

VEHICLE AND METHOD FOR CONTROLLING POWER SUPPLY TO EXTERNAL LOAD BASED ON SOC

CROSS-REFERENCE TO RELATED APPLICATION

The present application claims priority to Korean Patent Application No. 10-2022-0081683, filed on Jul. 4, 2022, the entire contents of which is incorporated herein for all purposes by this reference.

BACKGROUND OF THE PRESENT DISCLOSURE

Field of the Present Disclosure

The present disclosure relates to a vehicle in which power may be provided to an external load by use of a battery and a method of controlling the vehicle.

Description of Related Art

Vehicle-to-load (V2L) technology for supplying power of a battery to an external load is applied to recent electric vehicles. V2L technology enables power of a battery provided in a vehicle to be provided to an external load without additional equipment. The external load may refer to any of various electronic devices. For example, the external load may be a home appliance such as a laptop computer, an electric pot, an electric rice cooker, an electric grill, a microwave oven, a dryer, a refrigerator, a TV, or a washing machine. A user may use an electronic device outdoors by connecting the electronic device to a power outlet of a vehicle.

A conventional vehicle provided with V2L technology is set to provide only a certain percentage (e.g., 70%) of maximum capacity of a battery to an external load to leave power required for driving. In the conventional vehicle, because a state of charge (SOC) value of the battery kept for driving is fixed and may not be changed, the utilization of the battery is reduced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle in which, in relation to supplying power of a battery to an external load, a safety state of charge (SOC) value of the battery kept for driving may be adjusted, and a method of controlling the vehicle.

A vehicle according to an exemplary embodiment of the present disclosure includes a battery, a converter electrically connected to the battery and configured to provide electrical power of the battery to an external load, a communication unit configured to obtain current location information and charging place information, and a controller operatively connected to the battery, the converter and the communication unit, and configured to control the battery, the converter and the communication unit, wherein the controller is further configured to determine a required energy of the vehicle to travel from a current location of the vehicle to a nearest charging place after end of driving and parking of the vehicle, determine a safety state of charge (SOC) value of the battery for ensuring driving of the vehicle to the nearest charging place based on the required energy and a total capacity of the battery, and control the converter to cut off supplying of the power to the external load in response that an SOC value of the battery reaches the safety SOC.

The controller may be configured to determine driving energy efficiency based on a driving distance and consumed electrical energy from start of the driving till the end of the driving, and determine the required energy based on the driving energy efficiency and a minimum distance to the nearest charging place.

The controller may be configured to determine a sectional energy efficiency for each predetermined distance section, and determine an average energy efficiency for at least one distance section as the driving energy efficiency.

The controller may be configured to determine a first average energy efficiency for a first distance section, determine a second average energy efficiency for a second distance section having a negative sectional energy efficiency when the negative sectional energy efficiency reduced by a predetermined threshold from the first average energy efficiency is detected, and determine the second average energy efficiency as the driving energy efficiency.

The controller may be configured to determine a first average energy efficiency for first distance sections, and when sectional energy efficiency determined after the determining of the first average energy efficiency is greater than a value obtained by subtracting a predetermined threshold from the first average energy efficiency, determine again first average energy efficiency for all distance sections, and determine the re-determined first average energy efficiency as the driving energy efficiency.

The controller may be configured to set the safety SOC to a predetermined reference value based on a total capacity of the charged battery.

The charging place information may include at least one of charging station information obtained from a map or charger information set by a user.

A method of controlling a vehicle including a battery, a converter electrically connected to the battery and a communication unit, and configured to provide electrical power of the battery to an external load electrically connected to the converter, and a navigation device includes determining energy required to travel from a current location of the vehicle to a nearest charging place after end of driving and parking of the vehicle, determining a safety state of charge (SOC) value of the battery for ensuring driving of the vehicle to the nearest charging place based on the required energy and a total capacity of the battery, and controlling the converter to cut off supplying of the power to the external load in response that an SOC value of the battery reaches the safety SOC.

The method of controlling a vehicle may further include determining driving energy efficiency based on a driving distance and consumed electrical energy from start of the driving till the end of the driving, wherein the determining of the required energy includes determining the required energy based on the driving energy efficiency and a minimum distance to the nearest charging place.

The determining of the driving energy efficiency may include determining sectional energy efficiency for each predetermined distance section, and determining average energy efficiency for at least one distance section as the driving energy efficiency.

The determining of the driving energy efficiency may include determining a first average energy efficiency for a first distance section, determining a second average energy efficiency for a second distance section having a negative sectional energy efficiency when the negative sectional energy efficiency reduced by a predetermined threshold from the first average energy efficiency is detected, and determining the second average energy efficiency as the driving energy efficiency.

The determining of the driving energy efficiency may include determining a first average energy efficiency for first distance sections, and when sectional energy efficiency determined after the determining of the first average energy efficiency is greater than a value obtained by subtracting a predetermined threshold from the first average energy efficiency, determining again first average energy efficiency for all distance sections, and determining the re-determined first average energy efficiency as the driving energy efficiency.

The determining of the safety SOC value of the battery may include setting the safety SOC to a predetermined reference value based on a total capacity of the charged battery.

The charging place information may include at least one of charging station information obtained from a map or charger information set by a user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a flowchart for describing a method of controlling a vehicle, according to an exemplary embodiment of the present disclosure.

Figure 1:
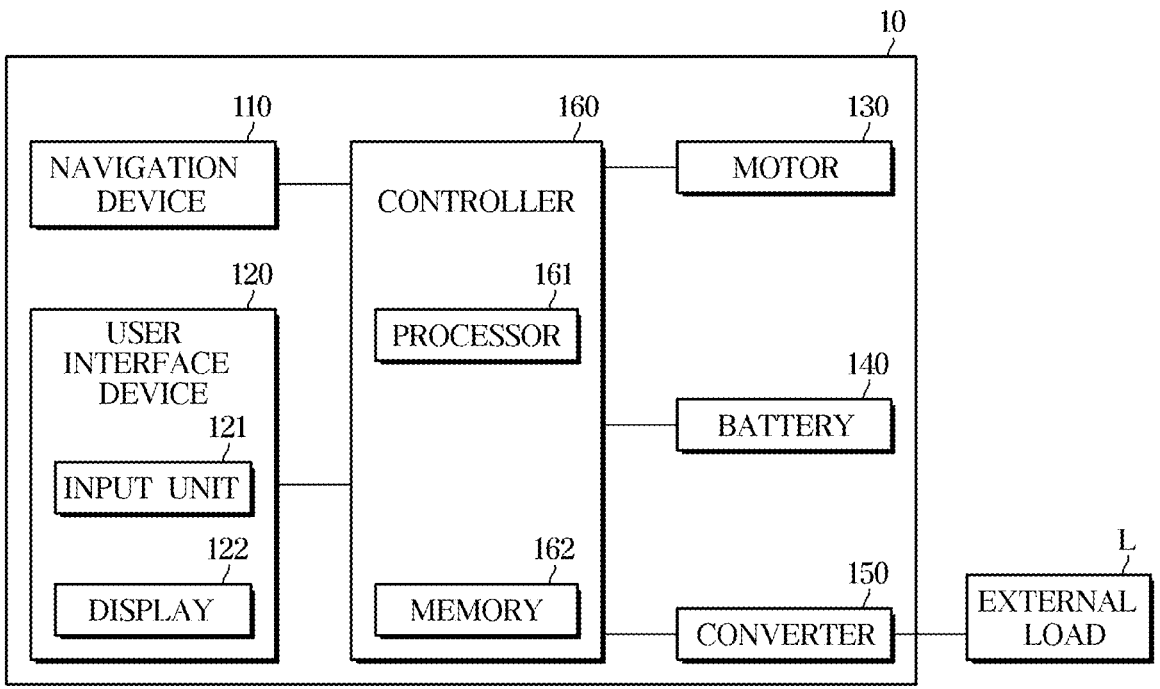
FIG. 1 is a control block diagram of a vehicle, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The same reference numerals denote the same elements throughout the specification. All elements of embodiments are not described in the specification, and descriptions of matters well known in the art to which the present disclosure pertains or repeated descriptions between the exemplary embodiments will not be given.

Also, in the present specification, it will be understood that when a part is "connected" to another part, the part may be directly connected to the other part, or may be indirectly connected to the other part, and the indirect connection includes connection through a wireless communication network.

Furthermore, when a part "includes" a predetermined element, the part may further include another element instead of excluding the other element, unless otherwise stated.

The singular forms "a," "an," and "the" are intended to include the plural forms as well, unless the context clearly indicates otherwise.

Also, the term such as " . . . unit", " . . . er", " . . . block", " . . . member", or " . . . module" may refer to a unit of processing at least one function or operation. For example, the above term may refer to at least one process performed by at least one hardware such as a field-programmable gate array (FPGA)/application-specific integrated circuit (ASIC), or at least one software or a processor stored in a memory.

Reference numerals used in operations are used to identify the operations, without describing the order of the operations, and the operations may be performed in an order different from the stated order unless a specific order is definitely specified in the context.

Embodiments of a vehicle and a method of controlling the vehicle according to an aspect will be described in detail with reference to the appended drawings.

FIG. 1 is a control block diagram of a vehicle, according to an exemplary embodiment of the present disclosure.

Referring to FIG. 1, a vehicle 10 of the present disclosure may be an electric vehicle (EV). The vehicle 10 may include a navigation device 110, a user interface device 120, a motor 130, a battery 140, a converter 150, and a controller 160. Various devices provided in the vehicle 10 may communicate with each other through a vehicle communication network NT. For example, the vehicle communication network may include a controller area network (CAN), Ethernet, media oriented systems transport (MOST), Flexray, and/or local interconnect network (LIN).

The controller 160 may be electrically connected to elements of the vehicle 10, and may control each of the elements of the vehicle 10. The controller 160 may include a processor 161 and a memory 162. The memory 162 may store a program, instructions, data, and/or an application related to an operation of the vehicle 10. The processor 161 may execute the program, the instructions, the data, and/or the application stored in the memory 162, and may control operations of various devices of the vehicle 10. The memory 162 and the processor 161 may be integrated into one chip. Also, the memory 162 and the processor 161 may be provided at physically separated positions. Also, a plurality of memories 162 and a plurality of processors 161 may be provided.

The memory 162 may include a non-volatile memory device such as a cache, a read-only memory (ROM), a programmable ROM (PROM), an erasable programmable ROM (EPROM), an electrically erasable programmable ROM (EEPROM), or a flash memory. Also, the memory 162 may include a volatile memory device such as a random-access memory (RAM), and may include a storage medium such as a Hard Disk Drive (HDD) or a compact disk (CD)-ROM. A type of the memory 162 is not limited thereto.

Devices provided in the vehicle 10 are not limited thereto, and the vehicle 10 may include various devices. For example, the vehicle 10 may include a driving assistance device, a steering device, a braking device, an acceleration device, a suspension device, a transmission device, and wheels.

Also, the vehicle 10 may include various sensors. For example, the vehicle 10 may include a speed sensor configured for detecting a speed of a wheel, an acceleration sensor configured for detecting an acceleration of the vehicle, a yaw-rate sensor configured for detecting a change in an angular velocity, a gyro sensor configured for detecting an inclination of the vehicle, a steering angle sensor configured for detecting a rotation and a steering angle of a steering wheel, an accelerator pedal sensor (APS) for detecting a position and a frequency of accelerator pedal operation, and a brake pedal sensor (BPS) for detecting a position and a frequency of brake pedal operation.

The navigation device 110 may obtain current location information of the vehicle 10, and may obtain an optimal driving route from a current location to a destination set by a driver. Also, the navigation device 110 may obtain charging place information, and may obtain an optimal driving route from the current location to a charging place. For example, the charging place information may include at least one of charging station information obtained from a map or charger information set by a user.

The navigation device 110 may communicate with an external server. The navigation device 110 may communicate with the external server by use of any of various communication methods. For example, the navigation device 110 may communicate with the external server by use of wireless communication technology. The navigation device 110 may be referred to as a communication unit.

The user interface device 120 may receive the user's input, and may output various information related to a function and a state of the vehicle 10. The user interface device 120 may include an input unit 121 and a display 122. Also, the user interface device 120 may include a sound output device (e.g., a speaker or a sound driver).

The input unit 121 of the user interface device 120 which is a device configured for receiving the user's input may be provided in a center fascia provided at the center portion of a dashboard inside the vehicle 10. For example, the input unit 121 may be implemented as a physical button, a knob, a touchpad, a touchscreen, a stick-type manipulation device, and/or a track ball.

The display 122 which is a device configured for outputting various information related to a function and a state of the vehicle 10 may include a display of a head unit and a cluster. The display 122 may be provided as a liquid-crystal display (LCD), a thin-film transistor-liquid crystal display (TFT LCD), an organic light-emitting diode (OLED), a flexible display, a three-dimensional (3D) display, a transparent display, and/or a head-up display (HUD).

The user interface device 120 may provide, to the user, an optimal driving route to a destination obtained by the navigation device 110 or an optimal driving route to a charging place. For example, the optimal driving route may be guided through the display 122. Also, various information such as charging place information and a charging state of the battery 140 may be output through the display 122.

The navigation device 110 may include a separate input unit and display. Although the navigation device 110 and the user interface device 120 have been separately described, the navigation device 110 and the user interface device 120 may be provided as one device.

The motor 130 my generate a torque due to a three-phase alternating current voltage applied through an inverter from the battery 140, and may transmit the torque to wheels of the vehicle 10 to perform acceleration or deceleration. Also, the motor 130 may provide regenerative energy to the battery 140, and the battery 140 may be charged by the regenerative energy.

The battery 140 may store electrical energy. The battery 140 may supply power required by various electronic devices of the vehicle 10. The battery 140 may be implemented as a package in which a plurality of battery units are collectively arranged. Also, the battery 140 may be a high voltage battery. For example, the battery 140 may provide direct current power by applying a direct current voltage (e.g., 400 V to 450 V) to the motor 130.

Remaining capacity of the battery 140 may be represented by a state of charge (SOC) value. An SOC value of the battery 140 may be expressed as a ratio between currently available capacity of the battery 140 and total capacity of the battery 140. An SOC value of the battery 140 may be expressed as a percentage (%) of a value obtained by dividing currently available capacity of the battery 140 by total capacity of the battery 140.

The converter 150 may provide electrical power of the battery 140 to an external load L. The external load L may be a home appliance such as a laptop computer, an electric pot, an electric rice cooker, an electric grill, a microwave oven, a dryer, a refrigerator, a TV, or a washing machine. When the external load L is connected to a power outlet provided in the vehicle 10, the converter 150 may convert electrical power of the battery 140 into power suitable for the external load L, and may provide the converted power to the external load L. Accordingly, technology of providing electrical power of the battery 140 to the external load L is referred to as vehicle-to-load (V2L).

As electrical power of the battery 140 is provided to the external load L, an SOC value of the battery 140 is reduced. When electrical power of the battery 140 is all consumed by the external load L, the vehicle 10 may not travel. Accordingly, when V2L technology is applied, a safety SOC value of the battery 140 is set to leave power required for driving. When an SOC value of the battery 140 is reduced to reach the safety SOC, power supply to the external load L is cut off.

In the related art, the safety SOC value of the battery 140 is set at the time of manufacture. For example, in the related art, the safety SOC value of the battery 140 is set to about 30% of total capacity of the battery 140. In the instant case, when an SOC value of the battery 140 reaches 30% of the total capacity of the battery 140 due to power consumption of the external load L, power supply to the external load L is cut off. In the related art, although a vehicle may safely move to a nearest charging place with only 20% of the total capacity of the battery 140, when an SOC value of the battery 140 is reduced to 30% of the total capacity of the battery 140, power supply to the external load L is cut off. Although 10% of the total capacity of the battery 140 may be further used by the external load L, power supply to the external load L is cut off, reducing the utilization of the battery 140. Accordingly, in the related art, because a safety SOC value of the battery 140 is fixed at the time of manufacture and may not be changed, the utilization of the battery 140 is reduced.

Also, because of various factors affecting an SOC value of the battery 140 such as vehicle characteristics, a driver's driving pattern, road characteristics, and weather, it is difficult to find a safety SOC value of the battery 140 optimized for each of various types of vehicles.

The vehicle 10 of the present disclosure may variably set a safety SOC value of the battery 140 in consideration of various factors affecting an SOC value of the battery 140. Accordingly, the vehicle 10 of the present disclosure may improve the utilization of the battery 140 and user convenience. A method of variably setting a safety SOC value of the battery 140 will now be described in detail.

Figure 3:
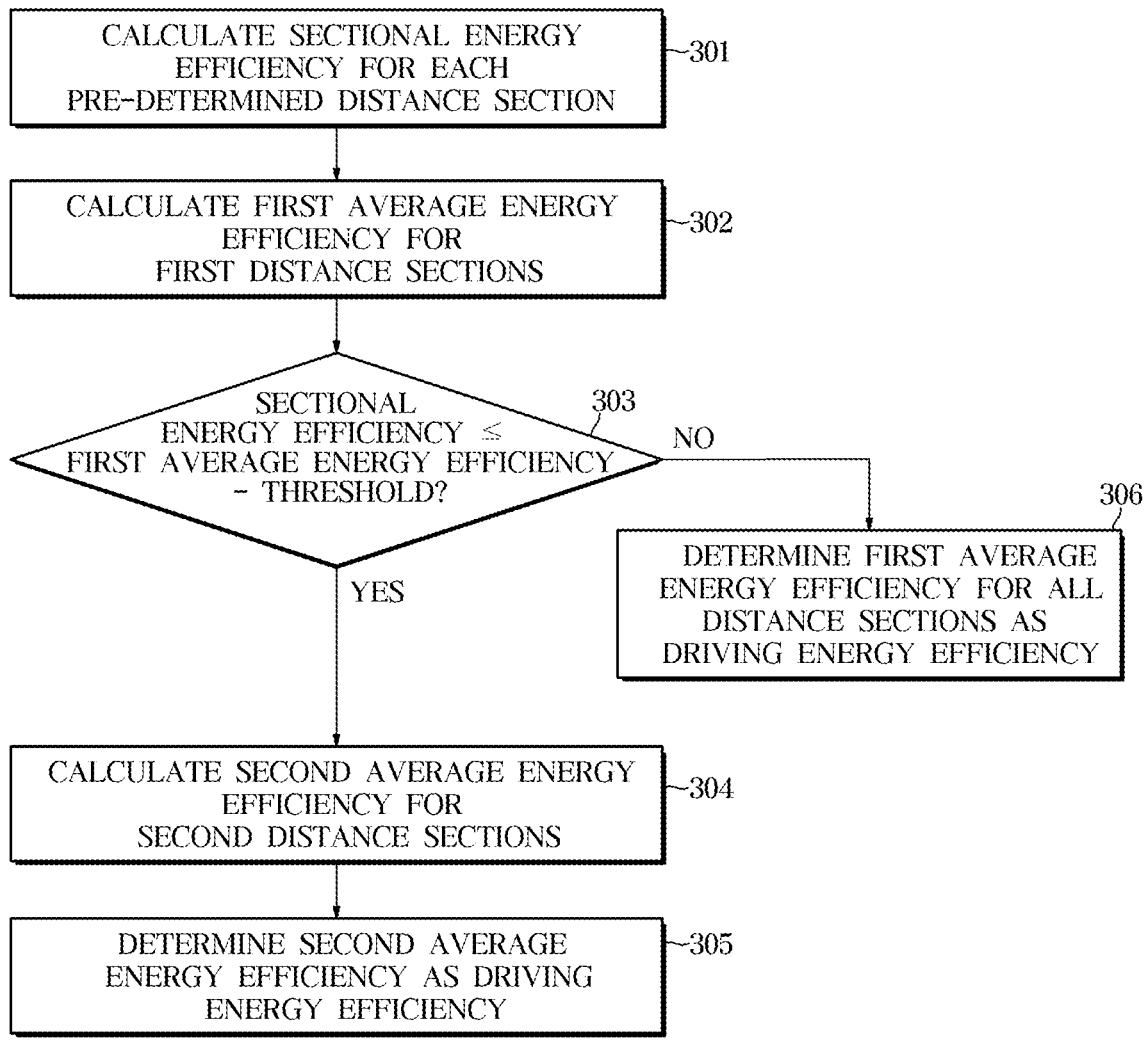
FIG. 3 is a flowchart for describing in more detail a method of determining driving energy efficiency in a method of controlling a vehicle, according to an exemplary embodiment of the present disclosure.

FIG. 2 is a flowchart for describing a method of controlling a vehicle, according to an exemplary embodiment of the present disclosure. FIG. 3 is a flowchart for describing in more detail a method of determining driving energy efficiency in a method of controlling a vehicle, according to an exemplary embodiment of the present disclosure.

Referring to FIG. 2, after the vehicle 10 is started and driving starts (201), the controller 160 of the vehicle 10 may determine driving energy efficiency based on a driving distance of the vehicle 10 till end of the driving and electrical energy consumed by the driving (202). To determine the driving energy efficiency, a driver's driving pattern, road characteristics (e.g., highway, urban road, flat road, or uphill road), and weather may be considered. Because power consumption may vary according to the driver's driving pattern, the driver's driving pattern may also be considered to determine the driving energy efficiency. The driver's driving pattern may be collected and analyzed for a predetermined time period and may be stored in the memory 162.

In relation to the determination of the driving energy efficiency, referring to FIG. 3, the controller 160 may determine a sectional energy efficiency for each predetermined distance section (301). A distance section may be defined as a unit distance for determining energy efficiency of the vehicle 10. Sectional energy efficiency refers to energy efficiency of the vehicle 10 for a distance section. While the vehicle 10 travels, the vehicle 10 may determine a sectional energy efficiency for each of distance sections. The distance section may vary according to user settings. For example, the distance section may be set to 1 km.

The controller 160 may determine an average energy efficiency for at least one distance section as driving energy efficiency. The controller 160 may determine a first average energy efficiency for first distance sections (302). The first distance sections may include a plurality of distance sections. The controller 160 may compare continuously determined sectional energy efficiency with previously determined first average energy efficiency. In other words, the first average energy efficiency may be determined for first distance sections, and sectional energy efficiency for a second distance section through which the vehicle 10 travels next to the first distance sections may be compared with the first average energy efficiency.

When negative sectional energy efficiency which is reduced by predetermined threshold from the first average energy efficiency is detected, the controller 160 may determine a second average energy efficiency for a second distance section having the negative sectional energy efficiency (303, 304). The controller 160 may determine the determined second average energy efficiency as driving energy efficiency (305). The second distance section having the negative sectional energy efficiency may include a plurality of distance sections through which the vehicle 10 continuously travels. In other words, when sectional energy efficiency determined after the determining of the first average energy efficiency is equal to or less than a value obtained by subtracting a predetermined threshold from the first average energy efficiency, the controller 160 may determine the second average energy efficiency for the second distance section after the first distance section as driving energy efficiency.

For example, negative sectional energy efficiency may be determined when the vehicle 10 travels an uphill road or an urban road. Energy consumption of the vehicle 10 on an uphill road is greater than that on a flat road. Energy consumption of the vehicle 10 on an urban road is greater than that on a highway. Accordingly, when the vehicle 10 travels a flat road or a highway and then travels an uphill road or an urban road, sectional energy efficiency may be reduced. Furthermore, when weather suddenly deteriorates, sectional energy efficiency may be reduced.

When sectional energy efficiency is sharply reduced, a difference from previously determined average energy efficiency is large. Accordingly, it is preferable to determine average energy efficiency again from a distance section having sectional energy efficiency which is sharply reduced. Because a safety SOC value of the battery 140 is to ensure driving to a nearest charging place after the driving of the vehicle 10 ends, it is necessary to more accurately reflect deterioration of sectional energy efficiency in determining the safety SOC value of the battery 140.

When sectional energy efficiency determined after the determining of the first average energy efficiency is greater than a value obtained by subtracting a predetermined threshold from the first average energy efficiency, the controller 160 may determine again first average energy efficiency for all distance sections through which the vehicle 10 travels, and may determine the first average energy efficiency as driving energy efficiency (303, 306). When sectional energy efficiency is not significantly reduced or when sectional energy efficiency is increased, the sectional energy efficiency may be combined with previously sectional energy efficiency to determine average energy efficiency.

Accordingly, the vehicle 10 of the present disclosure may determine driving energy efficiency of the vehicle 10 by use of two methods.

Referring back to FIG. 2, the controller 160 of the vehicle 10 may determine a required energy of the vehicle to travel from a current location of the vehicle to a nearest charging place after end of the driving and parking. The controller 160 may obtain a minimum distance to the nearest charging place. The controller 160 may determine required energy based on the driving energy efficiency and the minimum distance to the charging place (203, 204, 205).

For example, the charging place may include at least one of a charging station obtained from a map or a charging location set by a user. The controller 160 may compare a distance to the charging station with a distance to the charging location set by the user, and may select a nearest charging place between the charging station and the set charging location.

The controller 160 may determine a value obtained by dividing the minimum distance [km] to the nearest charging place by the determined driving energy efficiency [km/ kWh], as required energy [kWh]. For example, when the minimum distance to the charging place is 50 km and the driving energy efficiency is determined as 5 km/kWh, required energy may be determined as 10 kWh. That is, the required energy may be determined by use of Equation 1.

Required energy [kWh]=minimum distance to nearest charging place [km]/driving energy efficiency [km/kWh]     [Equation 1]

The controller 160 may determine a safety state of charge (SOC) value of the battery 140 for ensuring driving to a charging place based on the required energy and a total capacity of the battery 140 (206). The safety SOC value of the battery 140 may be determined as a percentage (%). The controller 160 may determine a value obtained by dividing the required energy by the total capacity of the battery 140 as a safety SOC value of the battery 140. For example, when the total capacity of the battery 140 is 80 kWh, the safety SOC value of the battery 140 may be determined to be 12.5%.

When an SOC value of the battery 160 reaches the safety SOC, the controller 160 may control the converter 150 to cut off power supply to the external load L (207). That is, when electrical power of the battery 140 is provided to the external load L, and an SOC value of the battery 140 is reduced and reaches the safety SOC, power supply to the external load L is cut off.

Figure 4:
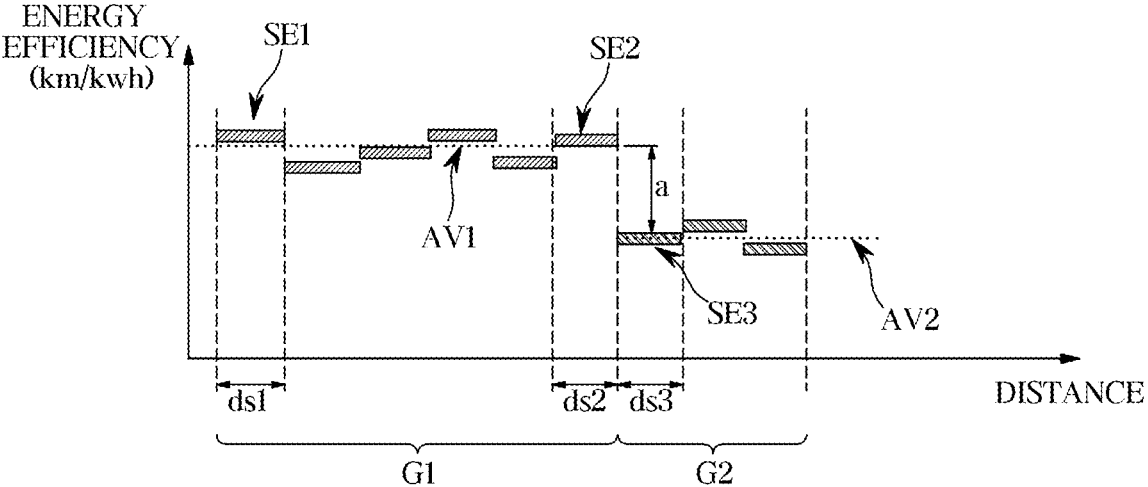
FIG. 4 is a graph for describing determination of driving energy efficiency when sectional energy efficiency is degraded.
Figure 5:
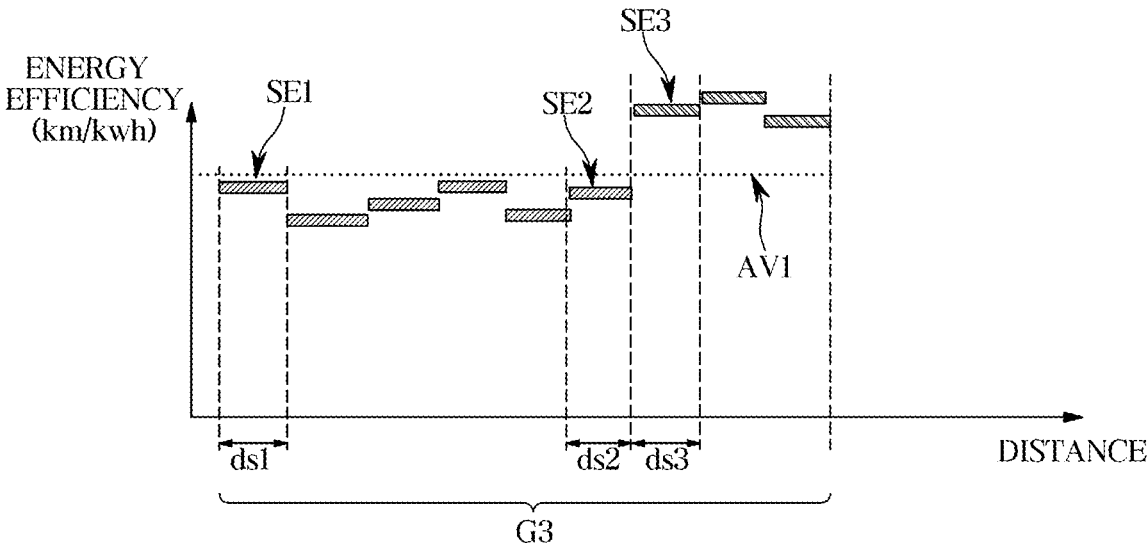
FIG. 5 is a graph for describing determination of driving energy efficiency when sectional energy efficiency is improved.

FIG. 4 is a graph for describing determination of driving energy efficiency when sectional energy efficiency is degraded. FIG. 5 is a graph for describing determination of driving energy efficiency when sectional energy efficiency is improved.

Referring to FIG. 4, the vehicle 10 may determine a sectional energy efficiency for each predetermined distance section while traveling. For example, the vehicle 10 may determine first sectional energy efficiency SE1 for a first distance section ds1, and second sectional energy efficiency SE2 for a second distance section ds2. There may be a plurality of different distance sections between the first distance section ds1 and the second distance section ds2. Sections from the first distance section ds1 to the second distance section ds2 may be referred to as a plurality of first distance sections G1 or a first section group G1. The vehicle 10 may determine a first average energy efficiency AV1 for the plurality of first distance sections G1.

Next, the vehicle 10 may travel through a third distance section ds3, and may determine third sectional energy efficiency SE3 for a third distance section ds3. The third sectional energy efficiency SE3 may be equal to or less than a value obtained by subtracting a predetermined threshold 'a' from the first average energy efficiency AV1 for previous distance sections. That is, the third sectional energy efficiency SE3 may correspond to negative sectional energy efficiency. Sectional energy efficiency determined for distance sections through which the vehicle 10 travels after the third distance section ds3 till end of driving of the vehicle 10 may be negative sectional energy efficiency. The distance sections after the third distance section ds3 may be referred to as a plurality of second distance sections G2 or a second section group G2. In the instant case, the vehicle 10 may determine second average energy efficiency AV2 from the third distance section ds3.

Accordingly, when sectional energy efficiency is sharply reduced, the controller 160 of the vehicle 10 may determine the second average energy efficiency AV2, instead of the first average energy efficiency AV1, as driving energy efficiency. After the vehicle 10 is parked, the controller 160 of the vehicle 10 may determine a safety state of charge (SOC) for ensuring driving to a charging place based on the second average energy efficiency AV2, a minimum distance to a nearest charging place, and total capacity of the battery 140.

Referring to FIG. 5, after the vehicle 10 determines the first average energy efficiency AV1 from the first distance section ds1 to the second distance section ds2, the third sectional energy efficiency SE3 for the third distance section ds3 may be determined to be greater than the first average energy efficiency AV1. In the instant case, the vehicle 10 may determine again first average energy efficiency AV1 for all distance sections G3 through which the vehicle 10 travels, and may determine the first average energy efficiency AV1 as driving energy efficiency.

A vehicle and a method of controlling the vehicle according to the present disclosure may adjust a safety SOC value of a battery which is kept for driving, in relation to supplying electrical power of the battery to an external load.

A vehicle and a method of controlling the vehicle according to the present disclosure may improve the utilization of a battery related to vehicle-to-load (V2L) technology by adjusting a safety SOC value of the battery which is kept. Accordingly, user convenience may be improved.

Disclosed exemplary embodiments of the present disclosure may be implemented on a recording medium storing instructions executable by a computer. The Instructions may be stored as program code, and when being executed by a processor, may cause a program module to be generated and operations of the disclosed exemplary embodiments to be performed. The recording medium may be implemented as a computer-readable recording medium.

The computer-readable recording medium includes any type of recording medium in which instructions readable by a computer are stored. Examples of the recording medium may include a read-only memory (ROM), a random-access memory (RAM), a magnetic tape, a magnetic disk, a flash memory, and an optical data storage.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:

a battery;

a converter electrically connected to the battery and configured to provide electrical power of the battery to an external load electrically connected to the converter;

a navigation device configured to obtain current location information of the vehicle and charging place information; and a controller operatively connected to the battery, the converter and the navigation device and configured to control the battery, the converter and the navigation device, wherein the controller is configured to:

determine a required energy of the vehicle to travel from a current location of the vehicle to a nearest charging place after end of driving and parking of the vehicle, determine a safety state of charge (SOC) value of the battery for ensuring driving of the vehicle to the nearest charging place based on the required energy and a total capacity of the battery, and control the converter to cut off supplying of the electrical power to the external load in response that an SOC value of the battery reaches the safety SOC value, wherein the controller is further configured to:

determine driving energy efficiency based on a driving distance and consumed electrical energy from start of the driving till the end of the driving, and determine the required energy based on the driving energy efficiency and a minimum distance to the nearest charging place, and wherein the controller is further configured to:

determine a sectional energy efficiency for each predetermined distance section while driving, and determine an average energy efficiency for at least one distance section as the driving energy efficiency, and wherein the controller is further configured to:

determine a first average energy efficiency for at least one first distance section, after the at least one first distance section, based on detecting that a negative sectional energy efficiency reduced by a predetermined threshold from the first average energy efficiency is detected, determine a second average energy efficiency for at least one second distance section having the detected negative sectional energy efficiency, and determine the second average energy efficiency as the driving energy efficiency, wherein the required energy is determined by dividing the minimum distance to the nearest charging place by the driving energy efficiency.

2. The vehicle of claim 1, wherein the controller is further configured to:

determine a first average energy efficiency for first distance sections, and when the sectional energy efficiency determined after the determining of the first average energy efficiency is greater than a value obtained by subtracting a predetermined threshold from the first average energy efficiency, determine again first average energy efficiency for all distance sections, and determine the re-determined first average energy efficiency as the driving energy efficiency.

3. The vehicle of claim 1, wherein the controller is configured to, set the safety SOC value to a predetermined reference value based on the total capacity of the battery.

4. The vehicle of claim 1, wherein the charging place information includes at least one of charging station information obtained from a map or charger information set by a user.

5. A method of controlling a vehicle including a battery, a converter electrically connected to the battery and a navigation device, and configured to provide electrical power of the battery to an external load electrically connected to the converter, the method comprising:

determining, by a controller operatively connected to the battery and the converter, required energy of the vehicle to travel from a current location of the vehicle to a nearest charging place after end of driving and parking of the vehicle;

determining, by the controller, a safety state of charge (SOC) value of the battery for ensuring driving of the vehicle to the nearest charging place based on the required energy and a total capacity of the battery;

controlling, by the controller, the converter to cut off supplying of the electrical power to the external load in response that an SOC value of the battery reaches the safety SOC value, and wherein the method further includes:

determining, by the controller, driving energy efficiency based on a driving distance and consumed electrical energy from start of the driving till the end of the driving, wherein the determining of the required energy includes determining the required energy based on the driving energy efficiency and a minimum distance to the nearest charging place, wherein the determining of the driving energy efficiency includes:

determining sectional energy efficiency for each predetermined distance section while driving; and determining average energy efficiency for at least one distance section as the driving energy efficiency, wherein the determining of the driving energy efficiency further includes:

determining a first average energy efficiency for at least one first distance section;

after the at least one first distance section, based on detecting that a negative sectional energy efficiency reduced by a predetermined threshold from the first average energy efficiency is detected, determining a second average energy efficiency for at least one second distance section having the detected negative sectional energy efficiency; and determining the second average energy efficiency as the driving energy efficiency, and wherein the determining of the required energy includes determining the required energy by dividing the minimum distance to the nearest charging place by the driving energy efficiency.

6. The method of claim 5, wherein the determining of the driving energy efficiency further includes:

determining a first average energy efficiency for first distance sections; and when sectional energy efficiency determined after the determining of the first average energy efficiency is greater than a value obtained by subtracting a predetermined threshold from the first average energy efficiency, determining again first average energy efficiency for all distance sections, and determining the re-determined first average energy efficiency as the driving energy efficiency.

7. The method of claim 5, wherein the determining of the safety SOC value of the battery includes setting the safety SOC value to a predetermined reference value based on the total capacity of the battery.

8. The method of claim 5, wherein the charging place information includes at least one of charging station information obtained from a map or charger information set by a user.

9. A non-transitory computer readable storage medium on which a program for performing the method of claim 5 is recorded.

* * * * *